(12) United States Patent
Xu et al.

(10) Patent No.: US 12,452,202 B2
(45) Date of Patent: Oct. 21, 2025

(54) METHOD TO SUPPORT MULTIPLE UPLINKS FAILOVER BETWEEN SWITCH INTERFACES WITH PORT SECURITY

(71) Applicant: Hewlett Packard Enterprise Development LP, Spring, TX (US)

(72) Inventors: Ke Xu, Beijing (CN); Zhijun Ren, Beijing (CN); Chunfeng Wang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 378 days.

(21) Appl. No.: 18/197,487

(22) Filed: May 15, 2023

(65) Prior Publication Data
US 2024/0388560 A1   Nov. 21, 2024

(51) Int. Cl.
| | |
|---|---|
| *H04L 61/2596* | (2022.01) |
| *H04L 9/40* | (2022.01) |
| *H04L 69/22* | (2022.01) |
| *H04L 69/40* | (2022.01) |
| *H04L 101/622* | (2022.01) |

(52) U.S. Cl.
CPC ........ *H04L 61/2596* (2013.01); *H04L 63/162* (2013.01); *H04L 69/22* (2013.01); *H04L 69/40* (2013.01); *H04L 2101/622* (2022.05)

(58) Field of Classification Search
None
See application file for complete search history.

(56) References Cited

U.S. PATENT DOCUMENTS

| | | | | |
|---|---|---|---|---|
| 10,374,830 | B1* | 8/2019 | Datta | ........... H04L 12/4625 |
| 10,389,629 | B2* | 8/2019 | Dunbar | ............. H04L 12/66 |
| 10,476,797 | B2* | 11/2019 | Natarajan | ............ H04L 45/54 |
| 2021/0119718 | A1* | 4/2021 | V.K. | ............. H04J 3/0667 |
| 2023/0008913 | A1* | 1/2023 | Menon | ............... H04L 45/66 |

OTHER PUBLICATIONS

Cisco, "Configuring Port Security," Mar. 17, 2023, Catalyst 4500 Series Switch Cisco IOS Software Configuration Guide, 12.2(25)EW, Chapter 32, <https://web.archive.org/web/20230317051604/http://www.cisco.com/c/en/us/td/docs/switches/lan/catalyst4500/12-2/25ew/configuration/guide/conf/port_sec.html>, 8 pages.

(Continued)

*Primary Examiner* — Younes Naji
(74) *Attorney, Agent, or Firm* — Yao Legal Services, Inc.

(57) ABSTRACT

A first switch port receives a first control packet, a header having a source media access control (MAC) address of a first MAC of a first interface of a sending device and a payload containing a second MAC of a second interface of the same sending device. The first and second interfaces form a bonded interface for failover purposes on the sending device. A second switch port receives a second control packet, a header having the second MAC as its source MAC and a payload containing the first MAC. The switch associates the first and second MAC addresses as related MAC addresses associated with the bonded interface. The switch facilitates failover between the secure interfaces via multiple uplinks while maintaining the port security on the switch by allowing transmission of data from either the first or second MAC address, associated as related MAC addresses, without triggering a port security violation.

17 Claims, 6 Drawing Sheets

(56) References Cited

OTHER PUBLICATIONS

Wikipedia, "Link Layer Discovery Protocol", available online at <<https://en.wikipedia.org/w/index.php?title=Link_Layer_Discovery_Protocol&oldid=1150327277>>, Apr. 17, 2023, 4 pages.
Wikipedia, "MAC filtering", available online at <<https://en.wikipedia.org/w/index.php?title=MAC_filtering&oldid=1134663232>>, Jan. 19, 2023, 1 page.

* cited by examiner

METHOD TO SUPPORT MULTIPLE UPLINKS FAILOVER BETWEEN SWITCH INTERFACES WITH PORT SECURITY

BACKGROUND

Field

In some deployment scenarios, an access device (such as an access point (AP)) may use multiple uplinks to a switch for failover or redundancy purposes. A customer (i.e., a user of the AP) may also wish to use a port security mechanism of the switch. However, the port security mechanism of the switch may conflict with a redundancy mechanism of the AP, resulting in undesired interface shutdowns.

BRIEF DESCRIPTION OF THE FIGURES

In the figures, like reference numerals refer to the same figure elements.

DETAILED DESCRIPTION

Figure 1A:
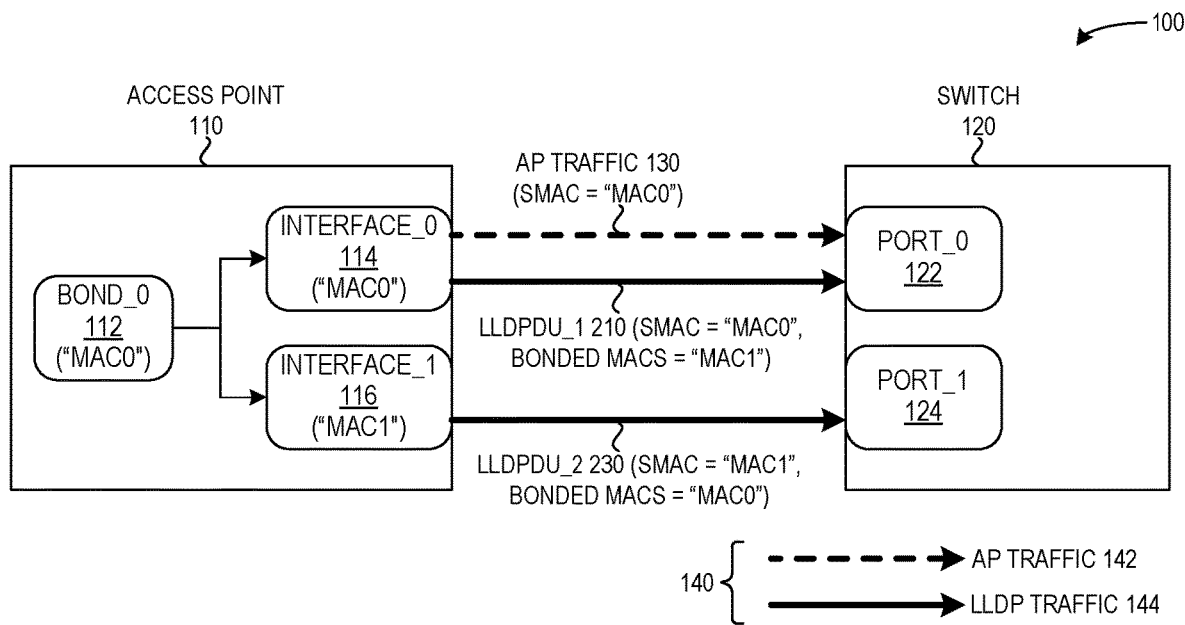
FIGS. 1A and 1B illustrate an environment facilitating port failover while maintaining port security at a switch, in accordance with an aspect of the present application.

Aspects of the instant application can address the conflict between a port security mechanism of a switch and a redundancy mechanism of an access device. The described aspects can provide to the switch, in Link Layer Discovery Protocol (LLDP) control packets, the media access control (MAC) addresses of all interfaces of the same AP (e.g., all interfaces which form a bonded interface on the access device), which allows the switch to associate and recognize the secure interfaces with their respective MAC addresses as connected to a single AP. The switch can thus allow multiple MAC addresses of the single AP to be seen on a secure interface and can further allow the multiple MAC addresses of the single AP to move between the secure interfaces (e.g., via failover) without violating a port security rule.

As described above, an access device (such as an AP or a gateway) may use multiple uplinks to a switch for failover or redundancy purposes. At the same time, a customer (such as a user of the AP) may also wish to use a port security mechanism of the switch. The port security mechanism can restrict input to an interface by limiting and identifying MAC addresses of the devices or stations which are allowed to access the port. A security violation may occur when a maximum number of secure MAC addresses have been learned on an interface of the switch and, subsequently, a device or station whose MAC address has not been previously seen on the interface attempts to access the interface. A security violation may also occur when a MAC address which is learned or configured on one secure interface is seen on another secure interface in the same virtual local area network (VLAN).

In examples in which the port security mechanism will allow only one secure MAC address per secure interface, more than one MAC address being seen on a given secure interface may trigger a port security violation. A default action in response to such triggering of a port security violation can be to shut down the given secure interface, which results in discarding all incoming and outgoing traffic through the given secure interface.

The described aspects can resolve the conflict between the port security and the AP failover or redundancy by providing, from the AP to the switch, control packets which utilize an organizationally specific TLV field and include the MAC addresses of all interfaces of the same AP (e.g., all interfaces which form a bonded interface on the AP). This can facilitate allowing the switch to associate and recognize the secure interfaces with their respective MAC addresses as connected to a single AP, thus avoiding the previously described port security violations and undesired interface shutdowns, as described below in relation to FIGS. 1A, 1B, and 2.

The term "network device" refers to devices, components, units, or entities which can include multiple ports or interfaces for uplinks and can communicate with other network devices in the manner described herein. Examples of network devices can include access devices (such as APs and gateways) and switches.

The terms "bonding device" and "bonded interface" are used interchangeably in this disclosure and refer to a single access device or interface with which multiple secure interfaces are associated or related. In aspects of this disclosure, a bonding device may be referred to and depicted as a "sending device," and two interfaces on a sending device may form a bonded interface for failover or redundancy purposes, as described below in relation to FIGS. 1A, 1B, 2, and 5

Environment Depicting Port Failover while Maintaining Port Security

While several modes of bonding devices or bonded interfaces may exist, one mode which is widely used for link redundancy is an active-standby mode. As an example, APs can use multiple uplink interfaces which are bonded in the active-standby mode to support redundancy and reliability of the multiple uplink interfaces.

In some aspects, an AP can include two uplink interfaces and a switch can include two ports, where a first uplink interface of the AP to a first port of the switch can be designated as an active uplink, while a second uplink interface of the AP to a second port of the switch can be designated as a standby uplink.

Figure 1B:
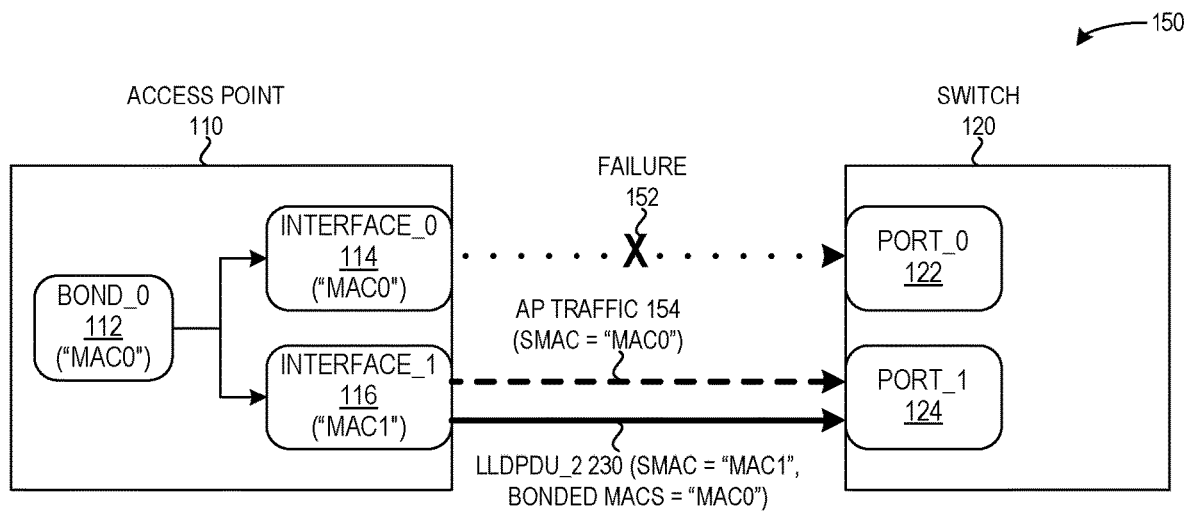
Figure 2:
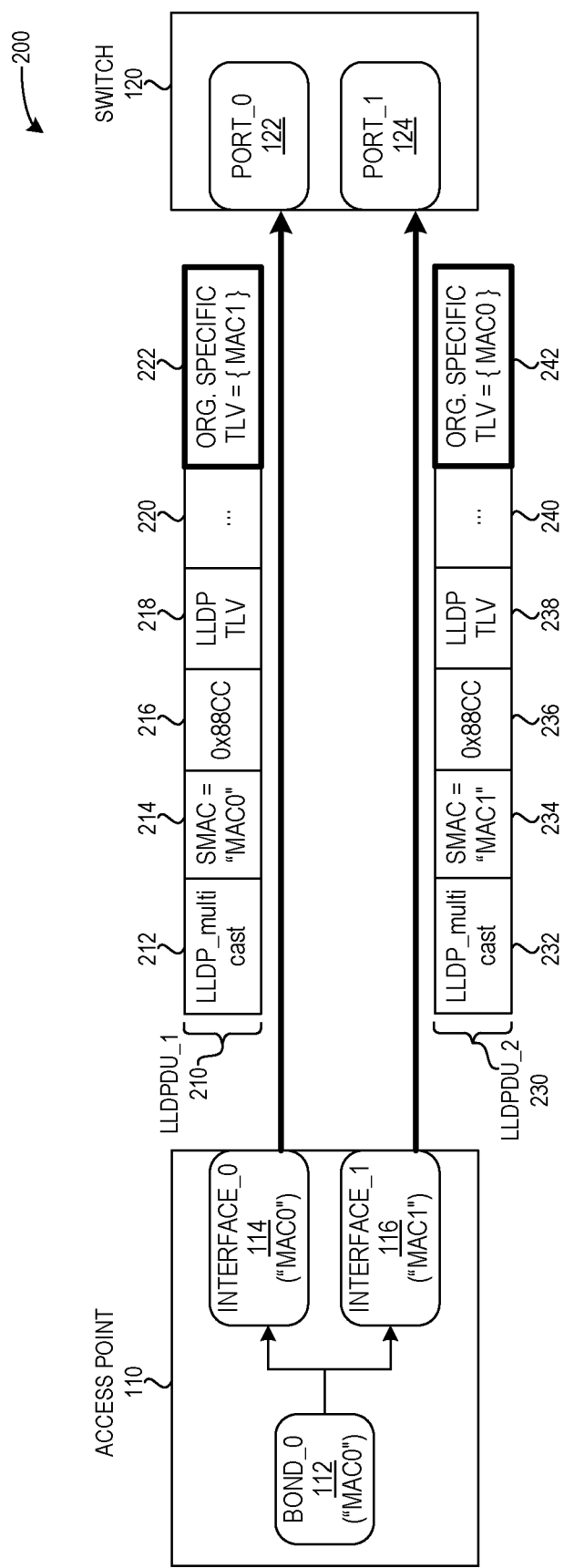
FIG. 2 illustrates an environment facilitating port failover while maintaining port security at a switch, including control packets which indicate an organizationally specific type-length-value (TLV) field, in accordance with an aspect of the present application.

FIGS. 1A and 1B illustrate environments 100 and 150 facilitating port failover while maintaining port security at a switch, in accordance with an aspect of the present application. Environment 100 can include a sending device (e.g., an AP 110) and a switch (e.g., a switch 120). AP 110 can represent a bonded device (bond_0 112, with a MAC address of "MAC0"). AP 110 can include two interfaces which are bonded to bond_0 112: an interface_0 114, with a MAC address also of "MAC0"; and an interface_1 116, with a MAC address of "MAC1." Switch 120 can include: a port_0 122; and a port_1 124. In FIGS. 1A, 1B, and 2, AP traffic is indicated as a bold dashed line (as in 142 of an index 140), while LLDP traffic is indicated as a bold solid line (as in 144 of index 140).

During operation, interface_0 114 may be configured to act as the active uplink to switch 120, while interface_1 116 may be configured to act as the standby uplink to switch 120. On the active uplink, interface_0 114 may transmit two types of traffic: a first type of traffic can include control information, e.g., LLDP traffic; and a second type of traffic can include the transmission of data packets, e.g., AP traffic. On the standby uplink, interface_1 116 may transmit only one type of traffic: LLDP traffic.

LLDP traffic can advertise information relating to the LLDP protocol (e.g., in LLDP data units (DUs) as control packets) between two Ethernet interfaces which are directly connected. The LLDP specification can define the source MAC address of LLDP traffic as the physical MAC address of the sending interface. Thus, in a conventional system, both LLDP traffic and AP traffic on the active uplink may be indicated with a source MAC address of "MAC0" corresponding to interface_0 114, while LLDP traffic on the standby uplink may be indicated with a source MAC address of "MAC1" corresponding to interface_1 116.

In the event of an error, failure, or other malfunction (e.g., a broken link or an unplugged interface) associated with the active uplink interface_0 114, the system can commence a failover from the active uplink to the standby uplink, thus setting interface_1 116 as the active uplink and interface_0 114 as the standby uplink. At this point, the AP traffic can failover on the newly active uplink interface_1 116. However, on the newly active uplink, the AP traffic is still indicated with a source MAC address of "MAC0," while the LLDP traffic can still be indicated with a source MAC address of "MAC1."

In this situation, the configuration of port security rules at the switch may apply on the interfaces which are connected to the AP via the multiple uplinks, e.g., uplinks in the active-standby bonding mode. As a result, two security violations may occur during failover. The first security violation is that after the uplink failover occurs, the MAC address MAC0 has moved between two secure interfaces, e.g., from port_0 122 to port_1 124. This would violate the port security rule which does not allow a previously learned MAC address to move from one interface to another interface. The second security violation is that after the uplink failover occurs, two MAC addresses (i.e., MAC0 and MAC1) are now being seen on the same secure interface. This would violate the port security rule which does not allow multiple MAC addresses to be seen on a single secure interface.

Examples described in this application can address this conflict between the uplink failover mechanism and the port security configuration by including the MAC addresses of the associated bonded devices or bonded interfaces in an organizationally specific TLV field in the LLDP DU. The described examples can thus resolve the above-described conflict in a deployment where dual AP uplinks in active-standby configuration are connected to switch interfaces in which port security is configured and enabled. In order to support the AP uplink failover without triggering a security violation on the security-enabled switch ports, the switch of the described aspects can recognize that the secure interfaces are connected to a single device (e.g., an AP), instead of to multiple individual devices. This single device can have multiple interfaces, each of which can have its own physical MAC address. The described switch can also allow multiple MAC addresses of the single device to be seen on a secure interface, instead of triggering a security violation. The described switch can further allow multiple MAC addresses of the single device to move between secure interfaces, instead of triggering a security violation.

LLDP can encapsulate the networking capability, management address, device identifier (ID), and interface ID of a local device into LLDP packets and can further send these LLDP packets (known as LLDP DUs) to neighboring devices. LLDP is an open IEEE standard (802.1AB). The networking devices described in this application (including APs and switches) may include pre-existing support for LLDP.

An LLDP DU can include: a destination MAC; a source MAC; an ethertype; and a sequence of TLVs. The sequence of TLVs can include three types of TLVs, including: mandatory TLVs; optional TLVs; and organizationally specific TLVs. The mandatory TLVs can include a chassis ID TLV, a port ID TLV, and a time to live TLV. The optional TLVs can include zero or more complete TLVs, such as a port description TLV, a system name TLV, a system description TLV, a system capabilities TLV, a management address TLV, and any reserved TLVs. An organizationally specific TLV can be a custom TLV which is supported via a TLV type with a value of "127." The organizationally specific TLV may be used by organizations and equipment vendors to define TLVs that advertise information to neighbors. The basic format for the organizationally specific TLV can include a TLV header and a TLV information string, as described below in relation to FIGS. 3 and 4.

In the described aspects, the AP can advertise the MAC addresses of its bonded devices or bonded interfaces in the organizationally specific TLV in the LLDP DU transmitted as control packets to the switch. The switch can recognize the organizationally specific TLV and associate the advertised MAC addresses as related MAC addresses, which can result in the switch allowing the advertised related MAC addresses to be seen on multiple secure interfaces and subsequently forward corresponding traffic accordingly, thus eliminating the undesired interface shutdowns traditionally resulting from triggering port security violations.

FIG. 2 illustrates an environment 200 facilitating port failover while maintaining port security at a switch, in accordance with an aspect of the present application. Interface_0 114 of AP 110 can transmit LLDP traffic to port_0 122 of switch 120, as an LLDPDU_1 210, while interface_1 116 of AP 110 can transmit LLDP traffic to port_1 124 of switch 120, as an LLDPDU_2 230. LLDPDU_1 210 can include: a destination MAC address field 212 indicating "LLDP_multicast"; a source MAC (SMAC) field 214 with a value of "MAC0"; an Ethernet type field 216 with a value of "0x88CC"; various mandatory/optional TLVs (such as fields 218 and 220); and an organizationally specific TLV field 222 with a value of "{MAC1}." LLDPDU_2 230 can include: a destination MAC address field 232 indicating "LLDP_multicast"; a source MAC (SMAC) field 234 with a value of "MAC1"; an Ethernet type field 236 with a value of "0x88CC"; various mandatory/optional TLVs (such as fields 238 and 240); and an organizationally specific TLV field 242 with a value of "{MAC0}."

Upon receiving LLDPDU_1 210 and LLDPDU_2 230, switch 120 can associate the MAC addresses "MAC1" and "MAC0" listed, respectively, in the organizationally specific TLV fields (222 and 242) as related MAC addresses associated with the same sending device, i.e., with the bonded interface on the sending device AP 110. This association can facilitate the failover between the secure interfaces via the multiple uplinks depicted in FIG. 2, by allowing transmission of data from either of the two MAC addresses ("MAC0" and "MAC1") without triggering a port security violation.

Returning to FIGS. 1A and 1B, in environment 100, the same two LLDPDU control packets 210 and 230 are illustrated as in FIG. 2. The transmission of AP traffic 130 is depicted, with a source MAC address of "MAC0" corresponding to interface_0 114 of AP 110. In the event of a condition which triggers failover (indicated by a bold X for a failure 152 in environment 150 of FIG. 1B), the system can commence a failover from the active uplink to the standby uplink, thus setting interface_1 116 as the active uplink and interface_0 114 as the standby uplink. At this point, the AP traffic can failover on the newly active uplink interface_1 116, sent as AP traffic 154, which traffic is indicated still with a source MAC address of "MAC0," while LLDPDU_2 230 control packet may be transmitted from interface_1 116, still using a source MAC address of "MAC1," but further including the MAC address of the other bonded interface in the organizationally specific field of LLDPDU_2 230.

As a result, the security violations which occurred as described above will no longer occur, because switch 120 has already associated the MAC addresses "MAC1" and MAC0" listed, respectively, in the organizationally specific TLV fields (222 and 242) as related MAC addresses associated with the same sending device, i.e., with the bonded interface on the sending device or AP 110. This association can result in facilitating the failover between the secure interfaces via the multiple uplinks, by allowing transmission of data from either of the two MAC addresses ("MAC0" and "MAC1") without triggering a port security violation.

While FIGS. 1A, 1B, and 2 illustrate examples with two bonded interfaces on the sending device and two ports on the switch, the described aspects can include more than two interfaces or ports via which the uplinks are established. In a scenario in which the access device has three or more bonded interfaces and the switch has three or more ports, the access device may include in each control packet sent from a respective interface: the source MAC of the respective interface (in the header of the LLDP DU packet); and a list of all the other source MAC addresses of the other interfaces (in the payload of the LLDP DU packet).

For example, in FIG. 2, if AP 110 included one or more other bonded interfaces (e.g., "interface_2" with a source MAC address of "MAC2," "interface_3" with a source MAC address of "MAC3," etc.) and switch 120 included one or more other ports (e.g., "port_2," port_3," etc.) (not shown), the TLV field 222 for LLDPDU_1 210 would include the source MAC address of interface_1 116 and the source MAC addresses of all the other bonded interfaces (e.g., {MAC1, MAC2, MAC3}). Similarly, the TLV field 242 for LLDPDU_2 230 would include the source MAC address of interface_0 114 and the source MAC addresses of all the other bonded interfaces (e.g., {MAC0, MAC2, MAC3}). Furthermore, an organizationally specific TLV field for a control packet sent by interface_2 (with a source MAC of "MAC2") of the AP to port_2 of the switch would include the source MAC address of interface_2 and the source MAC addresses of all the other bonded interfaces (e.g., {MAC0, MAC1, MAC3}). Note that the list of related or associated MAC addresses included in the organizationally specific TLV field can thus contain all the source MAC addresses of the bonded interfaces, but not the source MAC address of the interface sending the control packet.

Format for Organizationally Specific TLV

Figures 3, 4:
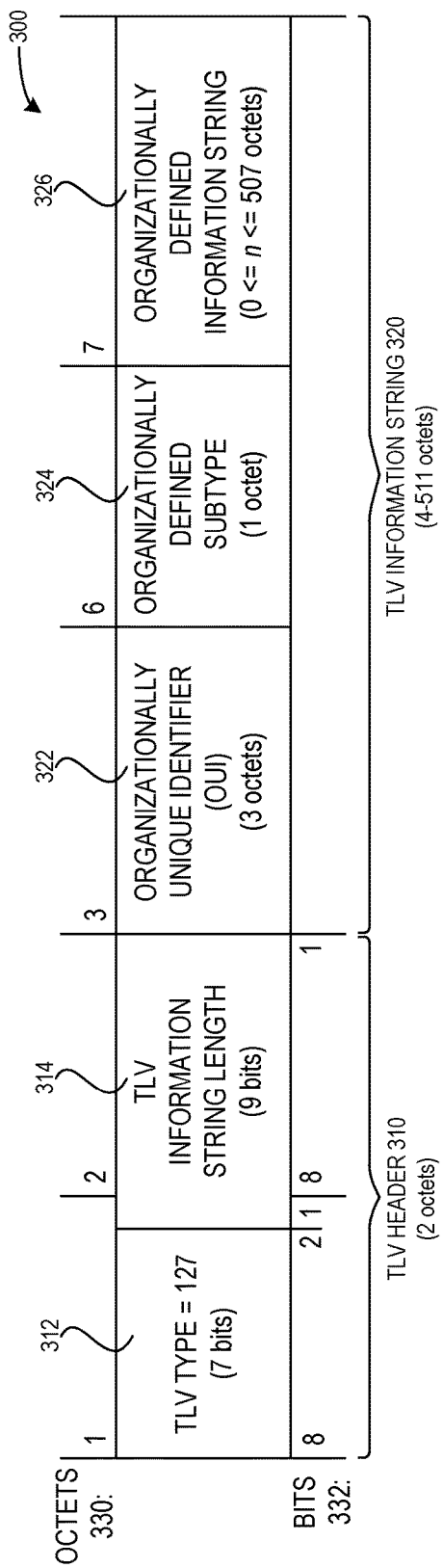
FIG. 3 illustrates a format for an organizationally specific TLV field, in accordance with an aspect of the present application.
FIG. 4 illustrates a table with the fields and descriptions which define an organizationally specific TLV, in accordance with an aspect of the present application.

FIG. 3 illustrates a format 300 for an organizationally specific TLV field, in accordance with an aspect of the present application. Format 300 can include a TLV header 310 (comprising 2 octets) and a TLV information string 320 (comprising 4-511 octets). Format 300 can indicate octets 330 in an upper line and bits 332 in a lower line. TLV header 310 can include: a TLV type field 312 with a value of "127" and a length of 7 bits; and a TLV information string length field 314 with a length of 9 bits. TLV information string 320 can include: an organizationally unique identifier (OUI) field 322 with a length of 3 octets; an organizationally defined subtype field 324 with a length of 1 octet; and an organizationally defined information string field 326 with a length n which is between 0 and 507 octets.

FIG. 4 illustrates a table 400 with the fields and descriptions which define an organizationally specific TLV, in accordance with an aspect of the present application. Table 400 can include entries with a field 402 column and a description 404 column. For example: an entry 410 can indicate a TLV type field with a corresponding description; an entry 412 can indicate a TLV information string length field with a corresponding description; an entry 414 can indicate an OUI field with a corresponding description; an entry 416 can indicate an organizationally defined subtype field with a corresponding description; and an entry 418 can indicate an organizationally defined information string field with a corresponding description, i.e., a sequence of the MAC addresses of the bonded device or bonded interfaces in a string format, as related MAC addresses.

Security Considerations to Handle Forged LLDP DU Control Packets

LLDP is a Layer 2 network protocol that is neither encrypted nor secure. Thus, an attacker may impersonate a legitimate network device by forging LLDP frames, e.g., LLDPDU_1 210 or LLDPDU_2 230 of FIG. 2. In some aspects of the instant application, the switch can recognize a bonded interface of a single sending device, i.e., via a pair of LLDP control packets sent from two interfaces which are bonded to or associated with a single bonding device, as described above in relation to FIG. 2. After receiving the pair of LLDP control packets (210 and 230) and associating the MAC addresses listed in the organizationally specific TLV as related MAC addresses from the same sending device, if the switch subsequently receives (e.g., on a third port, not shown in FIGS. 1A, 1B, and 2) a third LLDP control packet which is the same as a previously received LLDP control packet (e.g., an LLDP control packet with at least the same source MAC information and bonded MAC address information as in LLDPDU_1 210 and LLDPDU_2 230), the switch can determine that this third LLDP control packet may be forged, shut down the interface that received the forged control packet, and issue an alert or a notification for an end user. The switch can also shut down all the interfaces that were previously connected to the legitimate device and issue the alert or notification for the end user.

Upon receiving the alert or notification, the end user (or administrator, system operator, or other user associated with the system) can perform an investigative or remedial action in response to the alert or notification. In some aspects, the alert or notification may include information such as: an indication that the third packet has been received, where the third packet contains information that matches a previously received LLDP control packet used by the switch to learn MAC addresses associated with secure interfaces of a sending device; the source MAC address in the third packet; the related addresses included in the payload of the third packet; other information in the header or payload that may match a previously received LLDP control packet; and a suggested or recommended action to be taken by the end user, e.g., shutting down the port or interface via which the third packet is received, or shutting down all ports and interfaces via which the third packet and the previous LLDP control packets are received.

Thus, the described aspects provide a system which can resolve the conflict between multiple uplinks failover via different interfaces (e.g., at an AP) and port security configured at port interfaces. The system can use the LLDP advertising of the network device by inserting the related bonding device's associated MAC address(es) in customized fields in the payload of the LLDPDU control packet, as described above in relation to FIG. 2. One advantage of the described aspects is that the LLDP protocol is widely used and supported in a variety of network devices, which allows the described system to be implemented more easily and in a more feasible manner in real world network devices. Another advantage is that the described aspects may be applied to various types of network devices, in addition to the AP and switch illustrated herein as an example. Yet another advantage is that because the port security mechanism of the switch can negatively affect or prohibit the deployment of multi-interface network devices, the described aspects may be used to expand the adaptation of the port security mechanism of the switch. One additional advantage is that the LLDP and other protocols and communications described herein can work in a conflict-free manner, which can result in an increased reliability and ease of use to users without compromising security.

Method which Facilitates Port Failover while Maintaining Port Security

Figure 5:
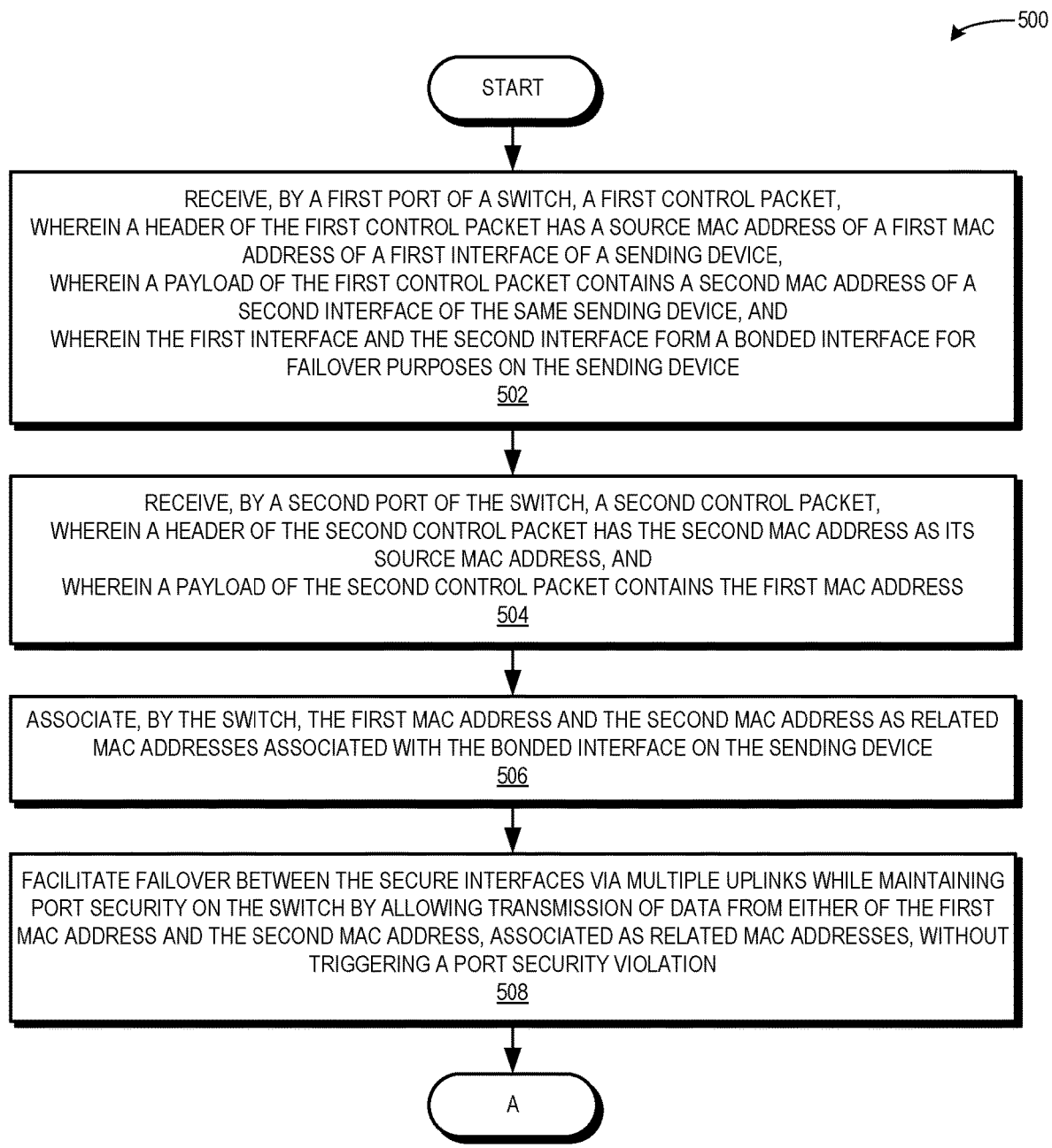
FIG. 5 presents a flowchart illustrating a method which facilitates port failover while maintaining port security at a switch, in accordance with an aspect of the present application.

FIG. 5 presents a flowchart 500 illustrating a method which facilitates port failover while maintaining port security at a switch, in accordance with an aspect of the present application. During operation, the system receives, by a first port of the switch, a first control packet, wherein a header of the first control packet has a source media access control (MAC) address of a first MAC address of a first interface of a sending device, wherein a payload of the first control packet contains a second MAC address of a second interface of the same sending device, and wherein the first interface and the second interface form a bonded interface for failover purposes on the sending device (operation 502). The system receives, by a second port of the switch, a second control packet, wherein a header of the second control packet has the second MAC address as its source MAC address, and wherein a payload of the second control packet contains the first MAC address (operation 504). The system associates, by the switch, the first MAC address and the second MAC address as related MAC addresses associated with the bonded interface on the sending device (operation 506). The system facilitates failover between the secure interfaces via multiple uplinks while maintaining the port security on the switch by allowing, by the switch, transmission of data from either of the first MAC address and the second MAC address, associated as related MAC addresses, without triggering a port security violation (operation 508). The operation continues at Label A of FIG. 6.

Figure 6:
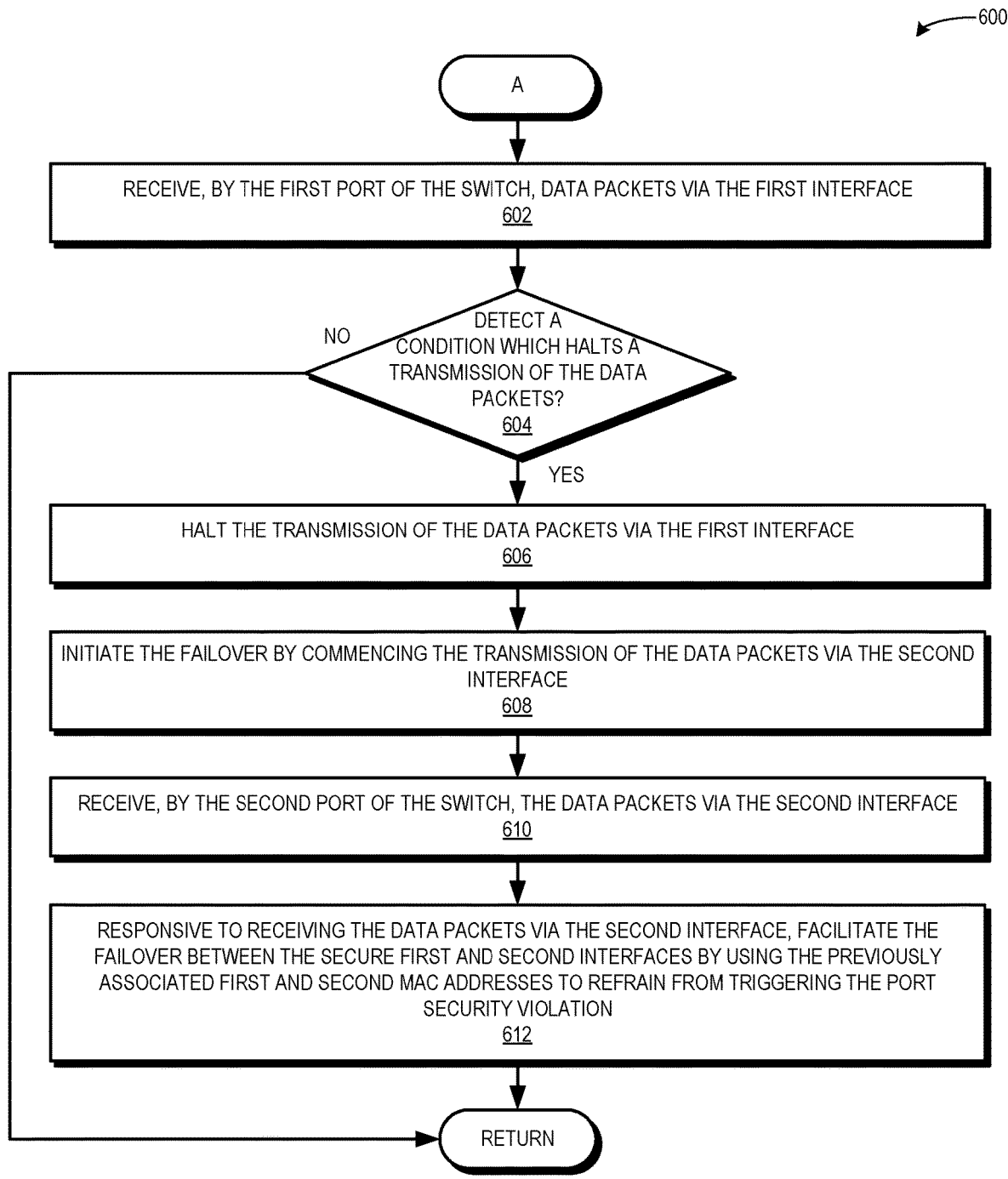
FIG. 6 presents a flowchart illustrating a method which facilitates port failover while maintaining port security at a switch, in accordance with an aspect of the present application.

FIG. 6 presents a flowchart 600 illustrating a method which facilitates port failover while maintaining port security at a switch, in accordance with an aspect of the present application. The system receives, by the first port of the switch, data packets via the first interface (operation 602). If the system does not detect a condition which halts a transmission of the data packets to the first port via the first interface (decision 604), the operation returns. If the system detects a condition which halts a transmission of the data packets to the first port via the first interface (decision 604), the system halts the transmission of the data packets via the first interface (operation 606). The system initiates the failover by commencing transmission of the data packets via the second interface (operation 608). The system receives, by the second port of the switch, the data packets via the second interface (operation 610). Responsive to receiving the data packets via the second interface, the system facilitates the failover between the secure first and second interfaces by using the previously associated first and second MAC addresses to refrain from triggering the port security violation (operation 612), and the operation ends.

Network Device which Facilitates Port Failover while Maintaining Port Security

Figure 7:
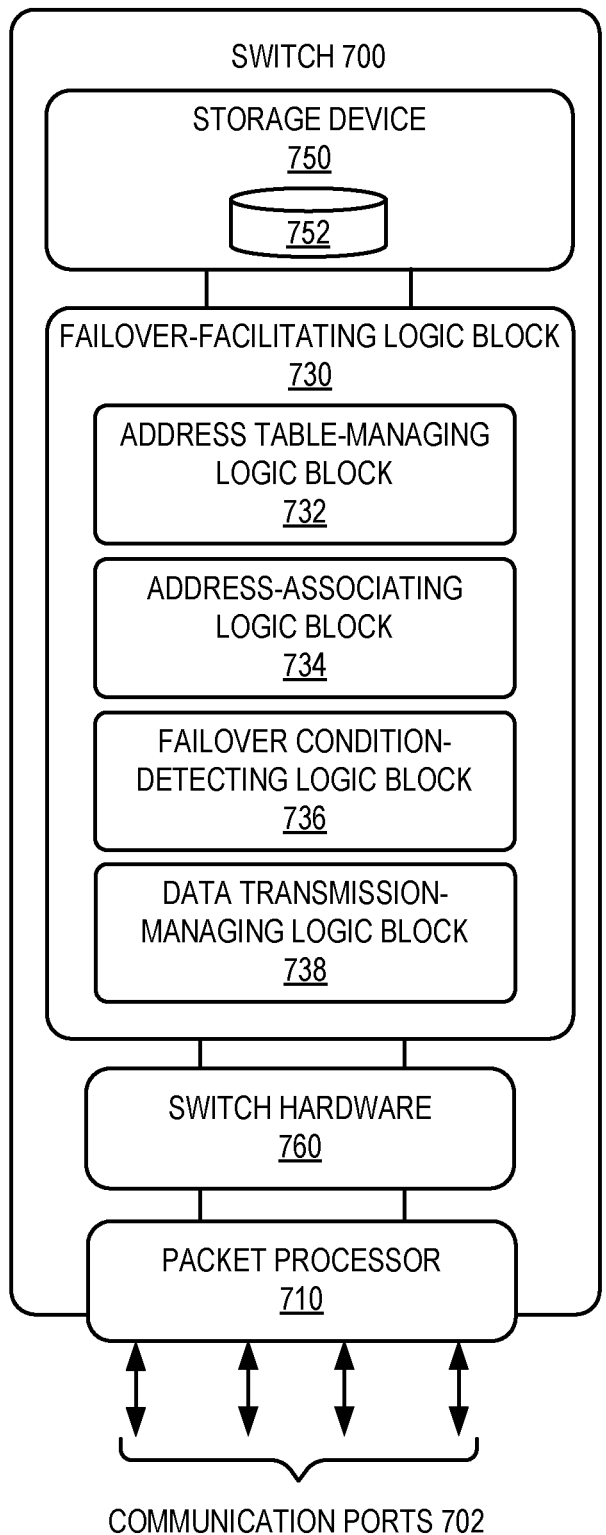
FIG. 7 illustrates a network device (e.g., a switch) which facilitates port failover while maintaining port security at a switch, in accordance with an aspect of the present application.

FIG. 7 illustrates a network device (e.g., a switch) 700 which facilitates port failover while maintaining port security at a switch, in accordance with an aspect of the present application. Switch 700 can include a number of communication ports 702, a packet processor 710, and a storage device 750. Switch 700 can also include switch hardware 760 (e.g., processing hardware of switch 700, such as its ASIC chips), which includes information based on which switch 700 processes packets (e.g., determines output ports for packets). Packet processor 710 can extract and process header information from the received packets. Packet processor 710 can identify a switch identifier (e.g., a MAC address and/or an IP address) associated with switch 700 in the header of a packet.

Communication ports 702 can include inter-switch communication channels for communication with other switches, user devices, and network devices. The communication channels can be implemented via a regular communication port and based on any open or proprietary format. Communication ports 702 can include one or more Ethernet ports capable of receiving frames encapsulated in an Ethernet header. Communication ports 702 can also include one or more IP ports capable of receiving IP packets. An IP port is capable of receiving an IP packet and can be configured with an IP address. Packet processor 710 can process Ethernet frames and/or IP packets. A respective port of communication ports 702 may operate as an ingress port and/or an egress port.

Switch 700 can maintain a database 752 (e.g., in storage device 750). Database 752 can be a relational database and may run on one or more Database Management System (DBMS) instances. Database 752 can store information associated with routing, configuration, and interfaces of switch 700. Database 752 may store data related to learned MAC addresses, including associated MAC addresses learned from an organizationally specific information field of a received control packet (e.g., via one of communication ports 702). Switch 700 can include a failover-facilitating logic block 730 that can facilitate port failover while maintaining port security. Failover-facilitating logic block 730 can include: an address table-managing logic block 732; an address-associating logic block 734; a failover condition-detecting logic block 736; and a data transmission managing logic block 738. Failover-facilitating logic block 730 can receive control packets, with header and payloads as described herein. Address table-managing logic block can store and manage learned addresses. Address-associating logic block 734 can associate multiple MAC addresses as related MAC addressed which are associated with the bonded interface on a sending device or with a bonded device. Failover condition-detecting logic block 736 can detect a condition which halts or affects transmission of data packets. Data transmission-managing logic block 738 can allow transmission of data from any MAC addresses which are previously learned and associated as related MAC addresses, without triggering a port security violation.

In general, the disclosed aspects provide a method, a non-transitory storage medium, and a computing system for facilitating port failover while maintaining port security at a switch. During operation, the system receives, by a first port of the switch, a first control packet, wherein a header of the first control packet has a source media access control (MAC) address of a first MAC address of a first interface of a sending device, wherein a payload of the first control packet contains a second MAC address of a second interface of the same sending device, and wherein the first interface and the second interface form a bonded interface for failover purposes on the sending device. The system receives, by a second port of the switch, a second control packet, wherein a header of the second control packet has the second MAC address as its source MAC address, and wherein a payload of the second control packet contains the first MAC address. The system associates, by the switch, the first MAC address and the second MAC address as related MAC addresses associated with the bonded interface on the sending device. The system facilitates failover between the secure interfaces via multiple uplinks while maintaining the port security on the switch by allowing, by the switch, transmission of data from either of the first MAC address and the second MAC address, associated as related MAC addresses, without triggering a port security violation.

In a variation on this aspect, the payload of the first control packet further contains one or more other MAC addresses of one or more other interfaces of the same sending device. The first interface, the second interface, and the one or more other interfaces form the bonded interface for failover purposes. The payload of the second control packet further contains the one or more other MAC addresses. The system receives, by one or more other ports of the switch, one or more other control packets, wherein a header of a respective other control packet has a respective other MAC address as its source MAC address, and wherein a payload of the respective other control packet contains the first MAC address, the second MAC address, and all of the one or more other MAC addresses except for the source MAC address of the respective other control packet. The system associates, by the switch, the first MAC address, the second MAC address, and the one or more other MAC addresses as related MAC addresses associated with the bonded interface on the sending device. The system facilitates the failover between the secure interfaces via multiple uplinks while maintaining the port security on the switch by allowing, by the switch, transmission of data from any of the first MAC address, the second MAC address, and the one or more other MAC addresses, associated as related MAC addresses, without triggering the port security violation.

In a further variation on this aspect, the system receives, by the first port of the switch, data packets via the first interface. Responsive to detecting a condition which halts transmission of the data packets to the first port via the first interface, the system performs the following operations: the system initiates the failover by commencing transmission of the data packets via the second interface; the system receives, by the second port of the switch, the data packets via the second interface; and responsive to receiving the data packets via the second interface, the system facilitates the failover between the secure first and second interfaces by using the previously associated first and second MAC addresses to refrain from triggering the port security violation.

In a further variation on this aspect, the system eliminates a conflict between: a redundancy mechanism of managing the uplinks between the sending device and the switch; and the port security at the switch.

In a further variation, the first control packet and the second control packet are generated by and received from a network device comprising an access point.

In a further variation, associating the first MAC address and the second MAC address causes the switch to recognize the first interface and the second interface as secure interfaces bonded to the same sending device.

In a further variation, the port security violation comprises at least one of: determining that a maximum number of secure MAC addresses have been learned on an interface of the switch and further determining that a device whose MAC address has not been previously seen on the interface attempts to access the interface; and determining that a MAC address learned or configured on one secure interface is subsequently seen on another secure interface in a same virtual local area network (VLAN).

In a further variation, a respective control packet comprises an LLDPDU, a payload of the respective control packet comprises an organizationally specific TLV field, and the organizationally specific TLV field comprises a header and a payload.

In a further variation, the header comprises: a TLV type of a fixed value, which is used to indicate all organizationally defined TLVs; and a TLV length, which is used to indicate a length of the payload represented by an octet string. The payload represented by the octet string comprises: an organizationally unique identifier (OUI), which comprises a unique identifier field that identifies an associated organization; an organizationally defined subtype, which comprises a vendor-specific definition that defines a new subtype to indicate subsequent MAC addresses belonging to bonded interfaces of the same device; and an organizationally defined information string, which comprises a sequence of the MAC addresses belonging to the bonded interfaces of the same device.

In a further variation, the first control packet comprises a first LLDPDU. The first LLDPDU includes, in the header of the first LLDPDU, the source MAC address of the first MAC address of the first interface of the sending device, and the first LLDPDU includes, in the payload of the first LLDPDU, a first organizationally specific TLV field which includes the second MAC address of the second interface of the same sending device. The second control packet comprises a second LLDPDU. The second LLDPDU includes, in the header of the second LLDPDU, the source MAC address of the second MAC address of the second interface, and the second LLDPDU includes, in the payload of the second LLDPDU, a second organizationally specific TLV field which includes the first MAC address of the first interface.

In another aspect, a non-transitory computer-readable storage medium stores instructions that when executed by a computer cause the computer to perform the method described above, including in relation to FIGS. 1A, 1B, 2, and 5-7.

In yet another aspect, a computer system comprises processing circuitry, forwarding hardware, a memory device to store an address table, at least a first port and a second port, a packet processor, an address-associating logic block, a failover-facilitating logic block, a failover condition-detecting logic block, and a data transmission-managing logic block. The logic blocks can perform the method and operations as described above, including in relation to FIGS. 1A, 1B, 2, and 5-7.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method for facilitating port failover while maintaining port security at a switch, the method comprising:
   receiving, by a first port of the switch, a first control packet comprising a first Link Layer Discovery Protocol Data Unit (LLDPDU),
   wherein the first LLDPDU includes, in a header of the first LLDPDU a first MAC address of a first interface of a sending device as a source media access control (MAC) address,
   wherein the first LLDPDU includes, in a payload of the first LLDPDU, a first organizationally specific type-length-value (TLV) field which includes a second MAC address of a second interface of the same sending device, and
   wherein the first interface and the second interface form a bonded interface for failover purposes on the sending device;
   receiving, by a second port of the switch, a second control packet comprising a second LLDPDU,
   wherein the second LLDPDU includes, in a header of the second LLDPDU the second MAC address as its source MAC address, and
   wherein the second LLDPDU includes, in a payload of the second LLDPDU, a second organizationally specific TLV field which includes the first MAC address;
   associating, by the switch, the first MAC address and the second MAC address as related MAC addresses associated with the bonded interface on the sending device; and
   facilitating failover between the first and second interfaces via multiple uplinks while maintaining the port security on the switch by allowing, by the switch, transmission of data from either of the first MAC address and the second MAC address, associated as related MAC addresses, without triggering a port security violation.

2. The method of claim 1,
   wherein the payload of the first LLDPDU further contains one or more other MAC addresses of one or more other interfaces of the same sending device,
   wherein the first interface, the second interface, and the one or more other interfaces form the bonded interface for failover purposes,
   wherein the payload of the second LLDPDU further contains the one or more other MAC addresses, and
   wherein the method further comprises:
   receiving, by one or more other ports of the switch, one or more other LLDPDUs,
   wherein a header of a respective other LLDPDU has a respective other MAC address as its source MAC address, and
   wherein a payload of the respective other LLDPDU contains the first MAC address, the second MAC address, and all of the one or more other MAC addresses except for the source MAC address of the respective other LLDPDU;
   associating, by the switch, the first MAC address, the second MAC address, and the one or more other MAC addresses as related MAC addresses associated with the bonded interface on the sending device; and
   facilitating the failover between the first, second, and one or more other interfaces via multiple uplinks while maintaining the port security on the switch by allowing, by the switch, transmission of data from any of the first MAC address, the second MAC address, and the one or more other MAC addresses, associated as related MAC addresses, without triggering the port security violation.

3. The method of claim 1, further comprising:
   receiving, by the first port of the switch, data packets via the first interface; and
   responsive to detecting a condition which halts transmission of the data packets to the first port via the first interface:
   initiating the failover by commencing transmission of the data packets via the second interface;
   receiving, by the second port of the switch, the data packets via the second interface; and
   responsive to receiving the data packets via the second interface, facilitating the failover between the first and second interfaces by using the previously associated first and second MAC addresses to refrain from triggering the port security violation.

4. The method of claim 1, further comprising eliminating a conflict between:
   a redundancy mechanism of managing the uplinks between the sending device and the switch; and
   the port security at the switch.

5. The method of claim 1,
   wherein the first LLDPDU and the second LLDPDU are generated by and received from a network device comprising an access point.

6. The method of claim 1,
   wherein associating the first MAC address and the second MAC address causes the switch to recognize the first interface and the second interface as secure interfaces bonded to the same sending device.

7. The method of claim 1, wherein the port security violation comprises at least one of:
   determining that a maximum number of secure MAC addresses have been learned on an interface of the switch and further determining that a device whose MAC address has not been previously seen on the interface attempts to access the interface; and determining that a MAC address learned or configured on one secure interface is subsequently seen on another secure interface in a same virtual local area network (VLAN).

8. The method of claim 1,
wherein the header of the first LLDPDU comprises:
a TLV type of a fixed value, which is used to indicate all organizationally defined TLVs; and
a TLV length, which is used to indicate a length of the payload of the first LLDPDU, the payload represented by an octet string; and
wherein the payload of the first LLDPDU comprises:
an organizationally unique identifier (OUI), which comprises a unique identifier field that identifies an associated organization;
an organizationally defined subtype, which comprises a vendor-specific definition that defines a new subtype to indicate subsequent MAC addresses belonging to bonded interfaces of the same device; and
an organizationally defined information string, which comprises a sequence of the MAC addresses belonging to the bonded interfaces of the same device.

9. A non-transitory computer-readable storage medium storing instructions executable by a computer to:
receive, by a first port of the switch, a first control packet comprising a first Link Layer Discovery Protocol Data Unit (LLDPDU),
wherein the first LLDPDU comprises, in a header of the first LLDPDU and as a source media access control (MAC) address, a first MAC address, a first interface of a sending device,
wherein the first LLDPDU comprises, in a payload of the first LLDPDU, a first organizationally specific type-length-value (TLV) field which includes a second MAC address of a second interface of the same sending device, and
wherein the first interface and the second interface form a bonded interface for failover purposes on the sending device;
receive, by a second port of the switch, a second control packet comprising a second LLDPDU,
wherein the second LLDPDU includes, in a header of the second LLDPDU, the second MAC address as its source MAC address, and
wherein the second LLDPDU includes, in a payload of the second LLDPDU, a second organizationally specific TLV field which includes the first MAC address;
associating, by the switch, the first MAC address and the second MAC address as related MAC addresses associated with the bonded interface on the sending device; and
facilitating failover between the first and second interfaces via multiple uplinks while maintaining the port security on the switch by allowing, by the switch, transmission of data from either of the first MAC address and the second MAC address, associated as related MAC addresses, without triggering a port security violation.

10. The non-transitory computer-readable storage medium of claim 9,
wherein the payload of the first LLDPDU further contains one or more other MAC addresses of one or more other interfaces of the same sending device,
wherein the first interface, the second interface, and the one or more other interfaces form the bonded interface for failover purposes,
wherein the payload of the second LLDPDU further contains the one or more other MAC addresses, and
wherein the method further comprises:
receiving, by one or more other ports of the switch, one or more other LLDPDUs,
wherein a header of a respective other LLDPDU has a respective other MAC address as its source MAC address, and
wherein a payload of the respective other LLDPDU contains the first MAC address, the second MAC address, and all of the one or more other MAC addresses except for the source MAC address of the respective other LLDPDU;
associating, by the switch, the first MAC address, the second MAC address, and the one or more other MAC addresses as related MAC addresses associated with the bonded interface on the sending device; and
facilitating the failover between the first, second, and one or more other interfaces via multiple uplinks while maintaining the port security on the switch by allowing, by the switch, transmission of data from any of the first MAC address, the second MAC address, and the one or more other MAC addresses, associated as related MAC addresses, without triggering the port security violation.

11. The non-transitory computer-readable storage medium of claim 9, wherein the instructions are executable to:
receive, by the first port of the switch, data packets via the first interface; and
responsive to detecting a condition which halts transmission of the data packets to the first port via the first interface:
initiate the failover by commencing transmission of the data packets via the second interface;
receive, by the second port of the switch, the data packets via the second interface; and
responsive to receiving the data packets via the second interface, facilitate the failover between the first and second interfaces by using the previously associated first and second MAC addresses to refrain from triggering the port security violation.

12. The non-transitory computer-readable storage medium of claim 9, the instructions executable to eliminate a conflict between:
a redundancy mechanism of managing the uplinks between the sending device and the switch; and
the port security at the switch.

13. The non-transitory computer-readable storage medium of claim 9,
wherein the first LLDPDU and the second LLDPDU are generated by and received from a network device comprising an access point.

14. The non-transitory computer-readable storage medium of claim 9, wherein the port security violation comprises at least one of:
determining that a maximum number of secure MAC addresses have been learned on an interface of the switch and further determining that a device whose MAC address has not been previously seen on the interface attempts to access the interface; and
determining that a MAC address learned or configured on one secure interface is subsequently seen on another secure interface in a same virtual local area network (VLAN).

15. The non-transitory computer-readable storage medium of claim 9,
wherein the header of the first LLDPDU comprises:
a TLV type of a fixed value, which is used to indicate all organizationally defined TLVs; and
a TLV length, which is used to indicate a length of the payload of the first LLDPDU, the payload represented by an octet string, and
wherein the payload of the first LLDPDU comprises:
an organizationally unique identifier (OUI), which comprises a unique identifier field that identifies an associated organization;
an organizationally defined subtype, which comprises a vendor-specific definition that defines a new subtype to indicate subsequent MAC addresses belonging to bonded interfaces of the same device; and
an organizationally defined information string, which comprises a sequence of the MAC addresses belonging to the bonded interfaces of the same device.

16. A computing system comprising:
processing circuitry;
forwarding hardware;
a memory device to store an address table;
at least a first port and a second port;
a packet processor to receive, by the first port, a first control packet comprising a first Link Layer Discovery Protocol Data Unit (LLDPDU),
wherein the first LLDPDU includes, in a header of the first LLDPDU and as a source media access control (MAC) address, a first MAC address of a first interface of a sending device,
wherein the first LLDPDU includes, in a payload of the first LLDPDU, a first organizationally specific type-length-value (TLV) field which includes a second MAC address of a second interface of the same sending device, and
wherein the first interface and the second interface form a bonded interface for failover purposes on the sending device;
the packet processor to receive, by the second port, a second control packet comprising a second LLDPDU,
wherein the second LLDPDU includes, in a header of the second LLDPDU, the second MAC address as its source MAC address, and
wherein the second LLDPDU includes, in a payload of the second LLDPDU, a second organizationally specific TLV field which includes the first MAC address;
an address-associating logic block to associate the first MAC address and the second MAC address as related MAC addresses associated with the bonded interface on the sending device; and
a failover-facilitating logic block to facilitate failover between the first and second interfaces via multiple uplinks while maintaining the port security on the switch by allowing, by the switch, a data transmission-managing logic block to handle transmission of data from either of the first MAC address and the second MAC address, associated as related MAC addresses, without triggering a port security violation.

17. The computing system of claim 16,
the packet processor further to receive, by the first port of the switch, data packets via the first interface; and
the computing system further comprising a failover condition-detecting logic block to detect a condition which halts transmission of the data packets to the first port via the first interface;
wherein the failover-facilitating logic block is to, responsive to detecting the condition which halts transmission of the data packets to the first port via the first interface:
initiate the failover by commencing transmission of the data packets via the second interface;
the packet processor to receive, by the second port of the switch, the data packets via the second interface; and
responsive to the packet processor receiving the data packets via the second interface, facilitate the failover between the first and second interfaces by using the previously associated first and second MAC addresses to refrain from triggering the port security violation.

* * * * *